US007295945B2

(12) United States Patent
Mok

(10) Patent No.: US 7,295,945 B2
(45) Date of Patent: *Nov. 13, 2007

(54) METHOD AND SYSTEM FOR TESTING ASSEMBLED MOBILE DEVICES

(75) Inventor: Winston Mok, Scarborough (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/556,030

(22) Filed: Nov. 2, 2006

(65) Prior Publication Data

US 2007/0061096 A1 Mar. 15, 2007

Related U.S. Application Data

(63) Continuation of application No. 10/945,973, filed on Sep. 22, 2004, now Pat. No. 7,165,003.

(51) Int. Cl.
*H04Q 7/20* (2006.01)
(52) U.S. Cl. .................. 702/118; 455/423
(58) Field of Classification Search ............ 702/118, 702/117; 455/423, 424, 425, 67.12, 67.11; 714/43; 370/241; 324/158.1
See application file for complete search history.

(56) References Cited

U.S. PATENT DOCUMENTS

| | | | | |
|---|---|---|---|---|
| 6,167,401 A | * | 12/2000 | Csipkes et al. ............... 707/10 |
| 6,525,657 B1 | * | 2/2003 | Wojcik ....................... 340/514 |
| 6,643,798 B2 | * | 11/2003 | Barton et al. ................. 714/25 |
| 2002/0183881 A1 | * | 12/2002 | Wright ........................ 700/115 |
| 2003/0027589 A1 | * | 2/2003 | Wennemer et al. ......... 455/550 |
| 2003/0069010 A1 | * | 4/2003 | Eravelli ...................... 455/423 |
| 2003/0129948 A1 | * | 7/2003 | Gab et al. .................. 455/67.1 |
| 2004/0093109 A1 | * | 5/2004 | O'Connor et al. .......... 700/117 |
| 2004/0093376 A1 | * | 5/2004 | De Boor et al. ............ 709/203 |
| 2004/0102187 A1 | * | 5/2004 | Moller et al. ............... 455/418 |
| 2004/0207422 A1 | * | 10/2004 | Lehtinen et al. ............ 324/758 |
| 2004/0255117 A1 | * | 12/2004 | Paatero et al. .............. 713/166 |

* cited by examiner

*Primary Examiner*—Carol S. W. Tsai
(74) *Attorney, Agent, or Firm*—Ogilvy Renault LLP

(57) ABSTRACT

A method and system for testing assembled mobile devices is provided. In accordance with one embodiment, there is provided a method for arranging test stages in a production line for the assembling and testing of wireless communications devices. The method comprises the steps of: determining a plurality of tests for testing an assembled wireless communication device, each test in the plurality of tests being one of an interactive test requiring physical actuation or mechanical dynamics to be performed on one or more interactive test components of the assembled wireless communication device, and a non-interactive test requiring no physical actuation or mechanical dynamics to be performed on the assembled wireless communication device; allocating each interactive test to an interactive test stage in the production line; and allocating each non-interactive test between the interactive test stage and a non-interactive test stage in the production line.

21 Claims, 6 Drawing Sheets

METHOD AND SYSTEM FOR TESTING ASSEMBLED MOBILE DEVICES

RELATED APPLICATION DATA

This application is a continuation of U.S. patent application Ser. No. 10/945,973, filed Sep. 22, 2004, now U.S. Pat No. 7,165,003.

TECHNICAL FIELD

This application relates to the field of mobile device testing, and more specifically to the testing of wireless devices using multiple function specific test pads and palettes.

BACKGROUND

Current wireless mobile communication devices include microprocessors, information storage capability, and run one or more software applications. Examples of software applications used in these wireless devices include micro-browsers, address books, and email clients. Additionally, these generations of wireless devices have access to a plurality of services via the Internet. A 3G wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms.

Before a manufacturer can sell wireless devices to consumers, the wireless devices must be fully tested. This is especially important for the newer generations of wireless devices which have increased functionality as described above.

Once a wireless device is assembled in full plastics, it typically progresses through various test stages to qualify each of its components. For mobile cellular devices these tests may include the following: Keys, Internal Mic (microphone), Internal Speaker, Charger, Buzzer, Vibrator, Vision, Radiated RF (radio frequency), etc.

Depending on the initial path of test development, most testing systems execute a series of test stages wherein each stage sequentially executes a subset of tests drawn from a test plan. As development progresses some of these test stages are consolidated depending on the compatibility of function, fixture, or process. For example, consider the following two exemplary testing system flows:

EXAMPLE 1

Stage 1: Keys, Buzzer, Charger, Vibrator, Vision, Current Levels
Stage 2: Internal Mic, Internal Speaker
Stage 3: Radiated RF

EXAMPLE 2

Stage 1: Charger, Vibrator, Vision, Current Levels
Stage 2: Buzzer, Internal Mic, Internal Speaker, Radiated RF Thus, as may be observed from the examples above, there is generally no standard, efficient method for defining test stages along with what tests are executed at any particular stage. In Example 1, the Radiated RF test is performed in a separate Stage 3 whereas in Example 2, the same test is performed in Stage 2.

A need therefore exists for a method and system for efficiently testing fully assembled wireless devices. Accordingly, a solution that addresses, at least in part, the above and other shortcomings is desired.

BRIEF DESCRIPTION OF THE DRAWINGS

It will be noted that throughout the appended drawings, like features are identified by like reference numerals.

DETAILED DESCRIPTION

Figure 1:
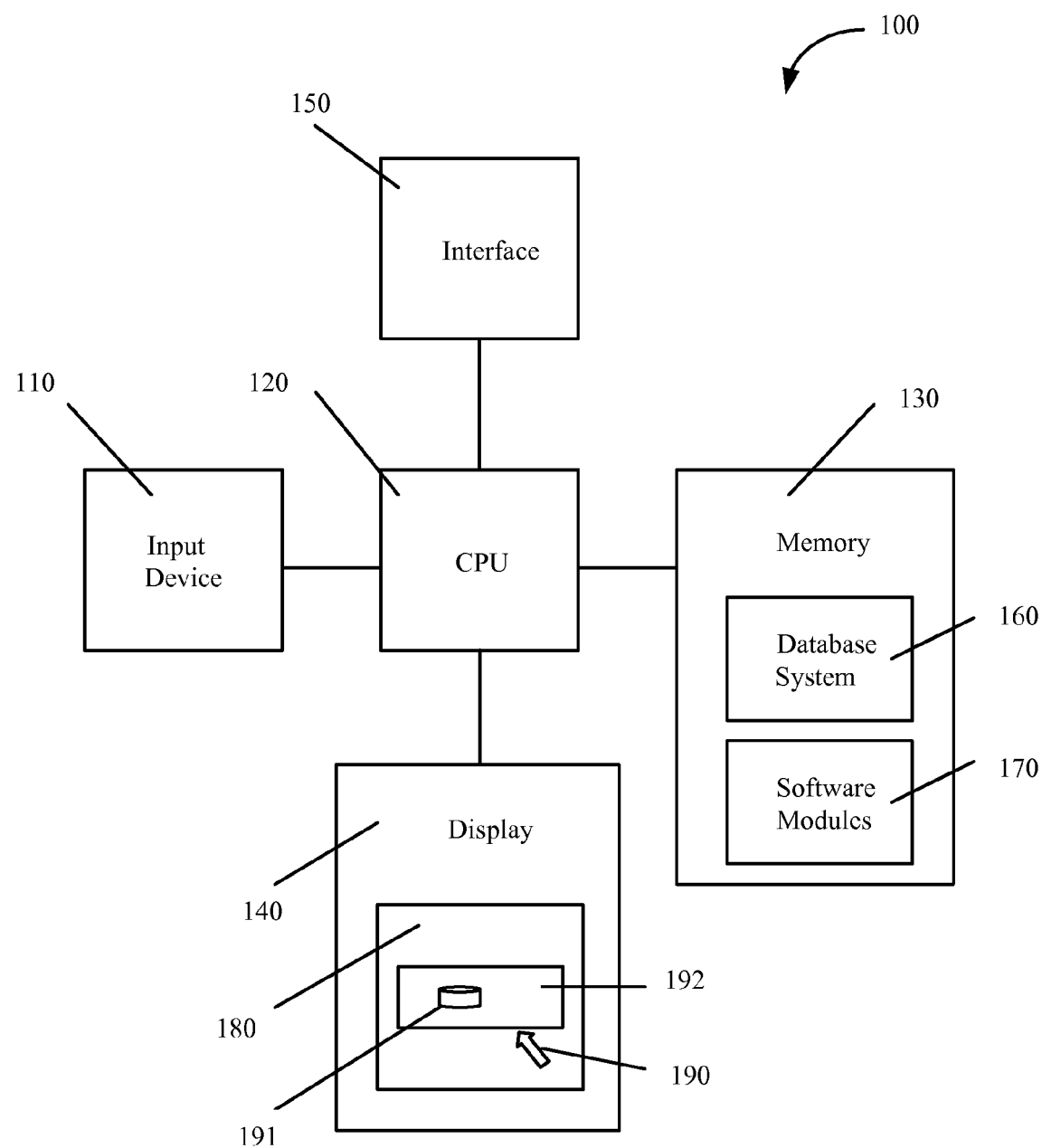
FIG. 1 is a block diagram illustrating an exemplary testing system adapted for implementing an embodiment of the application.

In accordance with one embodiment of the present disclosure, there is provided a method for arranging test stages in a production line for the assembling and testing of wireless communications devices, comprising the steps of: determining a plurality of tests for testing an assembled wireless communication device, each test in the plurality of tests being one of an interactive test requiring physical actuation or mechanical dynamics to be performed on at least one interactive test component of the assembled wireless communication device, and a non-interactive test requiring no physical actuation or mechanical dynamics to be performed on the assembled wireless communication device; allocating each interactive test to an interactive test stage in the production line; and allocating each non-interactive test between the interactive test stage and a non-interactive test stage in the production line.

In accordance with another embodiment of the present disclosure, there is provided a method of testing assembled wireless communications devices in a production line, comprising the steps of: receiving an assembled wireless communications device in the production line for testing in accordance with a plurality of tests comprising: one or more interactive tests each requiring physical actuation or mechanical dynamics to be performed on at least one interactive test component of the assembled wireless communication device, and one or more non-interactive tests each requiring no physical actuation or mechanical dynamics to be performed on the assembled wireless communication device; performing each of the interactive tests at an interactive test stage in the production line; and performing each of the non-interactive tests at a non-interactive test stage in the production line.

In accordance with a further embodiment of the present disclosure, there is provided a production line for assembling wireless communication devices, comprising: a final assembly stage for finally assembling each the wireless communication devices; an interactive test stage for performing one or more interactive tests requiring a physical actuation or mechanical dynamics to be performed on at least one interactive test component of each the assembled wireless communication devices; and a non-interactive test stage spatially separated from the interactive test stage in the production line for performing one or more non-interactive tests requiring no physical actuation or mechanical dynamics to be performed on the assembled wireless communication devices.

An aspect of the present disclosure provides a method for defining test stages for testing fully assembled wireless devices including which tests are to be executed during each particular stage. The method divides testing into two defined test stages. The division between each test stage is determined by the nature of the test. If the test requires physical actuation or mechanical dynamics in order to acquire a measurement, the test is classified as an "interactive" test (i.e., a mechanical test). Any test that does not require physical actuation/mechanical dynamics is classified as a "non-interactive" test (i.e., a non-mechanical test). This categorization of test type divides testing into two defined stages: the interactive test stage and the non-interactive test stage.

The advantage of grouping interactive tests into a single stage is that mechanical dynamics can be concentrated in one test fixture. In a complete testing system, this concentration minimizes the total number of drivers/actuators used since all moving parts are tested in one of the two test stages.

The advantage of grouping non-interactive tests into a single stage is that, theoretically, no mechanical dynamics need be designed into the test fixture for this stage. Mechanical dynamics in fixturing can cause unwanted variability due to changes in physical characteristics (i.e., actuators, moving cameras, etc.). By removing the mechanical dynamics in a test fixture, an increase in reproducibility and repeatability of measurements can be achieved. This improves the efficiency of testing.

In addition, an aspect of the present disclosure provides a universal fixture for testing fully assembled wireless devices in conjunction with a testing system. In accordance with a method aspect of the present application, labour costs associated with testing may be reduced by reducing multiple stage testing to a two-stage testing system. Fewer stages facilitates fewer human operators, faster testing, and more efficient production.

FIG. 1 is a block diagram illustrating an exemplary testing system 100 adapted for implementing an embodiment of the application. The testing system 100 includes an input device 110, a central processing unit or CPU 120, memory 130, a display 140, and an interface 150. The input device 110 may include a keyboard, mouse, trackball, remote control, or similar device. The CPU 120 may include dedicated coprocessors and memory devices. The memory 130 may include RAM, ROM, or disk devices. The display 140 may include a computer screen, terminal device, or a hardcopy producing output device such as a printer or plotter. And, the interface 150 may include a network connection including an Internet connection. The provisioning system 100 is adapted for testing wireless devices 700 (see FIG. 7) in conjunction with a test palette 500 (see FIG. 5) and a test pad 600 (see FIG. 6). The interface 150 also includes various test connectors for coupling to the test pad 600 as will be described below.

The testing system 100 may be a server system or a personal computer ("PC") system. The CPU 120 of the testing system 100 is operatively coupled to memory 130 which stores an operating system (not shown), such as IBM Corporation's OS/2™, Microsoft's Windows®, UNIX, etc., for general management of the system 100. The interface 150 may be used for communicating to external data processing systems through a network (see FIG. 2), such as the Internet. Examples of suitable platforms for the testing system 100 include iSeries™ servers and ThinkCentre™ personal computers available from IBM Corporation. The testing system 100 may include application server software (not shown), such as WebLogic® Server available from BEA Systems, Inc., for developing and managing distributed applications.

The testing system 100 may include a database system 160 for storing and accessing programming information. The database system 160 may include a database management system ("DBMS") and a database and is stored in the memory 130 of the testing system 100. It will be appreciated that the database system 160 may be shipped or installed without the database to or by end users. In general, the DBMS is adapted to read a query generated by the testing system 100 in response to a request for information submitted by a user typically through a user interface. The DBMS then executes the query against the database and provides a query result to the testing system 100 for presentation to the user. It will be appreciated that the database system 160 may be stored in the memory 130 of the testing system 100 or stored in a distributed testing system (not shown). 2).

Examples of suitable DBMSs include the Oracle® and DB2™ Universal Database Management System products available from Oracle Corporation and IBM Corporation, respectively. The DBMS is a software layer interposed between the actual database (i.e. the data as stored for use by the CPU 120 of the system 100) and the users of the system. The DBMS is responsible for handling database transactions thus shielding users from the details of any specific computer hardware or database implementation. Using relational techniques, the DBMS stores, manipulates and retrieves data in the form of table-like relations typically defined by a set of columns or attributes of data types and a set of rows (i.e. records or tuples) of data. The standard database query language for dealing with relational databases implemented by most commercial DBMSs is the Structured Query Language ("SQL").

The testing system 100 includes computer executable programmed instructions for directing the system 100 to implement the embodiments of the present application. The programmed instructions may be embodied in one or more software modules 170 resident in the memory 130 of the testing system 100. Alternatively, the programmed instructions may be embodied on a computer readable medium (such as a CD disk or floppy disk) which may be used for transporting the programmed instructions to the memory 130 of the testing system 100. Alternatively, the programmed instructions may be embedded in a computer-readable, signal-bearing medium that is uploaded to a network by a vendor or supplier of the programmed instructions, and this signal-bearing medium may be downloaded through the interface 150 to the testing system 100 from the network by end users or potential buyers.

The CPU 120 of the system 100 is typically coupled to one or more devices 110 for receiving user commands or queries and for displaying the results of these commands or queries to the user on a display 140. For example, user queries may be transformed into a combination of SQL commands for producing one or more tables of output data which may be incorporated in one or more display pages for presentation to the user. The CPU 120 is coupled to memory 130 for containing programs 170 and data such as base tables or virtual tables such as views or derived tables. As mentioned, the memory 130 may include a variety of storage devices including internal memory and external mass storage typically arranged in a hierarchy of storage as understood to those skilled in the art.

A user may interact with the testing system 100 and its software modules 170 using a graphical user interface ("GUI") 180. The GUI 180 may be web-based and may be used for monitoring, managing, and accessing the testing system 100. GUIs are supported by common operating systems and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Figure 7:
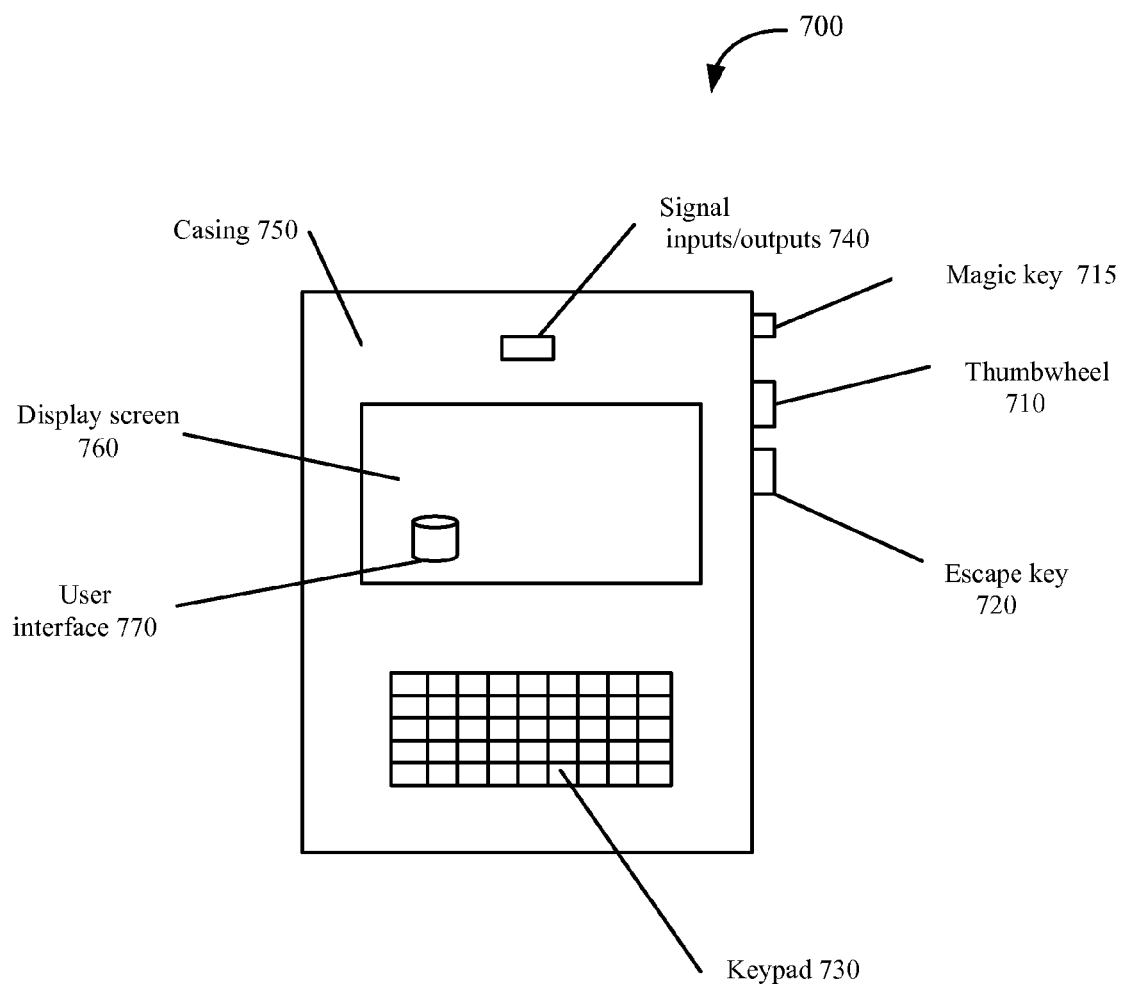
FIG. 7 is a front view illustrating a typical fully assembled wireless device.

FIG. 7 is a front view illustrating a typical fully assembled wireless device 700. The wireless device 700 can be a data and voice-enabled handheld. The wireless device 700 includes a casing 750, a display screen 760, a user interface 770, a keyboard 730, a thumbwheel (or trackwheel) 710, various select buttons 720, and various signal inputs/outputs 740 (e.g., power connector input, microphone, speaker, data interface input, etc.). Internally, the wireless device 700 includes one or more circuit boards, a CPU, memory, a battery, an antenna, etc. (not shown) which are coupled to the signal inputs/outputs 770, keyboard 730, display screen 760, etc.

Figure 2:
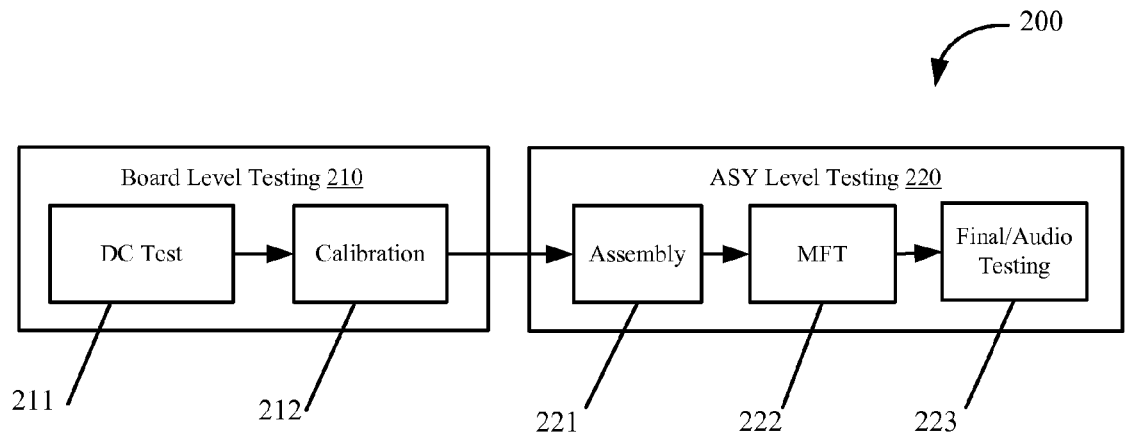
FIG. 2 is a flow chart illustrating a known method for testing wireless devices.

FIG. 2 is a flow chart 200 illustrating a known method for testing wireless devices 700. In a typical wireless device assembly and testing system, testing may be divided into board level testing 210 and fully assembled ("ASY") level testing 220. Board level testing 210 may include a DC test 211 and a calibration 212 test. During ASY level testing 220, wireless devices 700 are assembled and processed through a series of functional, RF, and audio tests. Each stage of testing usually requires its own test fixture, however, recent advances in testing have resulted in the combination of RF and audio testing into one fixture. The resulting three stages of testing at the ASY level 220 are as follows: assembly 221, MFT 222 (or Functional), and final/audio testing 223 (or RF+Audio).

According to an embodiment of the application, individual ASY level tests are categorized as one of interactive tests and non-interactive tests. As referred to above, an interactive test may be defined as any test that requires a physical motion or mechanical movement in order to test the component. An example would be a thumbwheel 710 test currently executed at the functional 222 test station. In addition, a non-interactive test may be defined as any test that requires no physical motion or mechanical movement in order to test the component. An example would be an audio test currently executed at the final/audio 223 test station. In addition, and also according to an embodiment of the present application, the assembly 221 tests and interactive tests are combined into one test stage. Finally, a new test fixture 400, 500, 600 for performing non-interactive tests is provided.

Figure 3:
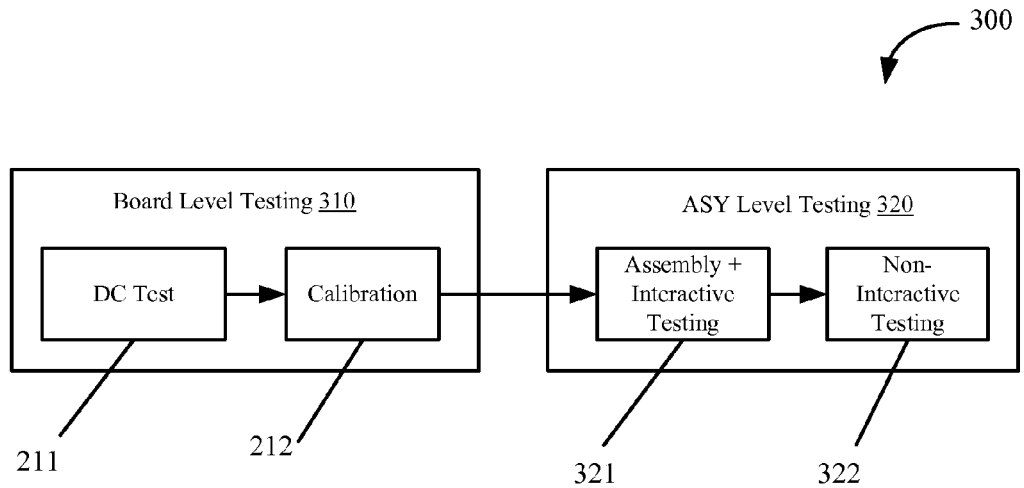
FIG. 3 is a flow chart illustrating a method for testing wireless devices in accordance with an embodiment of the application.

FIG. 3 is a flow chart 300 illustrating a method for testing wireless devices 700 in accordance with an embodiment of the application. As in FIG. 2, board level testing 310 includes a DC test 211 and a calibration 212 test. However, ASY level testing 320 now includes only two stages: assembly+interactive testing 321 and non-interactive testing 322. By classifying individual ASY level tests 320 as either interactive 321 or non-interactive 322 tests, the testing process can be reorganized based on the physical interaction requirements of the given tests. This allows for a reduction in current ASY level testing from three stages 221, 222, 223 to two stages 321, 322. Since the assembly 221 stage is inherently interactive, it can be combined with the interactive tests to form a single stage (assembly+interactive testing 321) in a production line and the remaining non-interactive tests (non-interactive testing 322) can be performed using a new test station and fixture, for example, fixtures 400, 500, 600.

The assembly+interactive testing 321 test stage is where the wireless device 700 is finally assembled and all interactive components are tested. Results are typically logged to the database system 160 of the testing system 100. All physical operations performed at this stage are often performed by a test person, though persons of ordinary skill in the art will appreciate that equipment may be used to replace some or all human activity.

According to an embodiment of the present application, the RF+audio test 223 shown in FIG. 2 is classified as a non-interactive test. Functional 222 testing on the other hand has a combination of both interactive and non-interactive features. In particular, the functional tests 222 shown in FIG. 2 typically include tests of the following features of the wireless device 700: (1) Thumbwheel 710; (2) Magic Key 715; (3) Escape Key 720; (4) Keypad 730; (5) Keypad Backlight; (6) LCD calibration; (7) LCD Screen 760; (8) LCD Backlight; (9) Charge Current; (10) Buzzer; (11) Vibrator; (12) LED; (13) Infrared; and (14) Holster.

Thus, in accordance with the present embodiment, reclassifying each functional test 222 as either an interactive 321 or non-interactive 322 test results in the following tests being classified as interactive tests 321: (1) Thumbwheel 710; (2) Magic Key 715; (3) Escape Key 720; and (4) Keypad 730. In addition, the following tests are classified as Non-Interactive tests 322: (1) LCD Calibration; (2) LCD Screen 760; (3) LCD Backlight; (4) Charge Current; (5) Keypad Backlight; (6) Buzzer; (7) Vibrator; (8) LED; (9) Infrared; and (10) Holster.

Consequently, the new assembly+interactive testing 321 stage requires the test person to add the testing of four components to their list of duties. To assist the test person, the test station for performing the assembly+interactive testing 321 stage can have access to the testing system 100. The testing system 100 is adapted for: (1) displaying photographs of current defects on its display screen 140 to assist test personnel with identifying such defects in wireless devices 700; (2) displaying step-by-step procedures during assembly; and (3) logging each test and assembly operation by operator or personal ID to the database system 160.

The non-interactive testing 322 test stage includes all non-interactive tests which are performed at a single test station. According to an embodiment of the present application, and in preparation for full automated testing, the design of the test station for performing non-interactive testing 322 includes minimal mechanical requirements. The test station for this testing includes the testing system 100 which is coupled to a test pad 600 which is in turn adapted to receive a test palette 500 which holds the wireless device 700.

By incorporating the non-interactive tests currently performed during functional testing 222 with RF+audio testing 223, time, resources, and labour may be saved. The following are non-interactive tests now included at the new non-interactive test stage 322: (1) LCD Screen 760; (2) LCD Backlight; (3) LCD Calibration; (4) LED; (5) Infrared; (6) Buzzer; (7) Holster; (8) Vibrator; (9) Keypad Backlight; (10) Charger Current; (11) All Audio Testing; and (12) All RF Testing.

Figure 5:
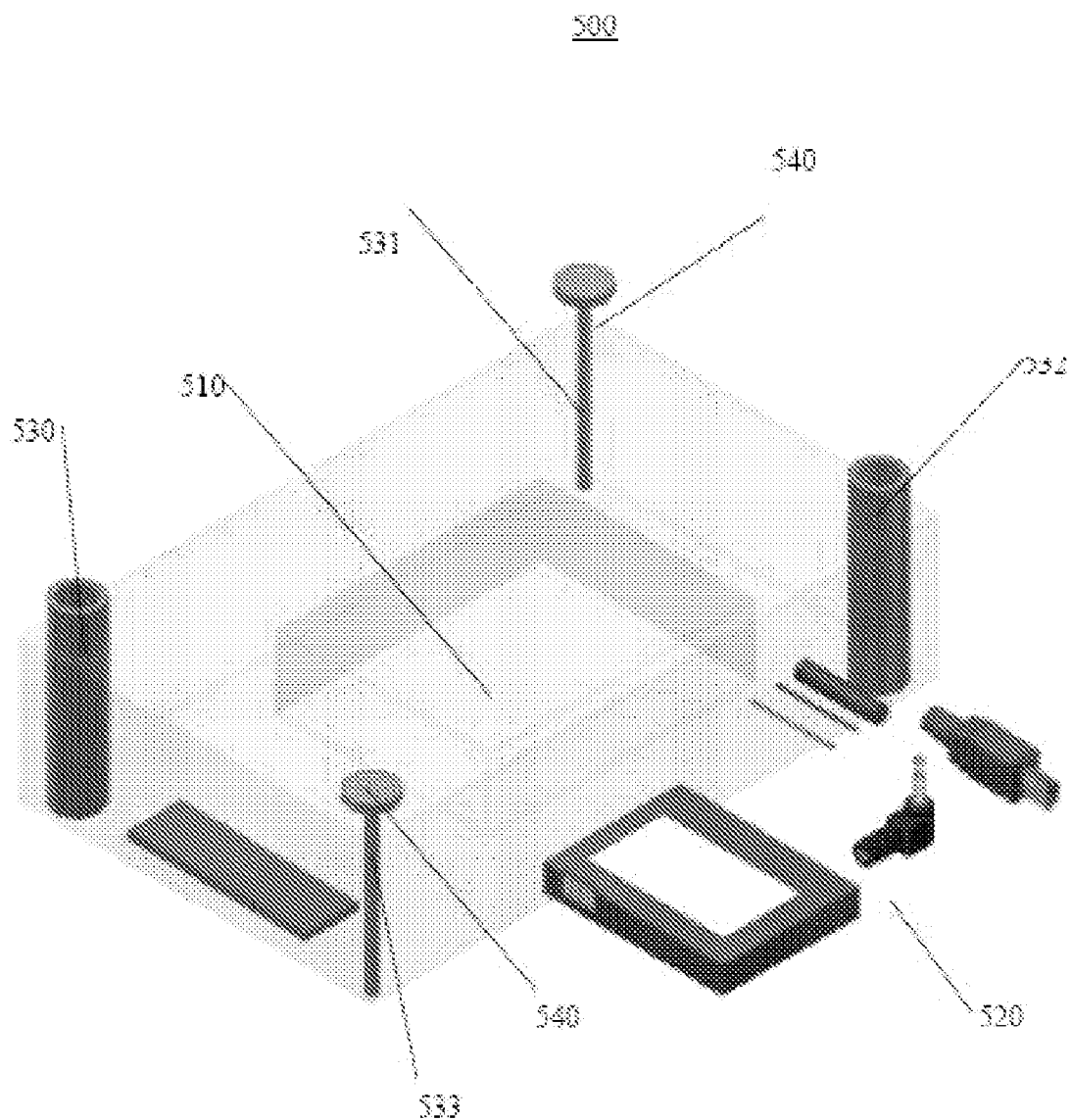
FIG. 5 is a perspective view illustrating a test palette for fully assembled wireless devices in accordance with an embodiment of the application.

FIG. 5 is a perspective view illustrating a test palette 500 for fully assembled wireless devices 700 in accordance with an embodiment of the application. Since non-interactive tests don't involve moving parts, the only physical motion required during this stage of the testing process is placing the wireless device 700 into the test fixture and subsequently removing the wireless device 700 from the text fixture. This handling is reduced to a pick and place movement by the palette-oriented text fixture 500 according to an embodiment of the present application.

In general, the test palette 500 is formed from silicone and internally houses all cable connections required for testing the wireless device 700. On the bottom of the palette 500 are a series of acoustic and vision cavities along with a connector pad. The palette's footprint mates with a test pad 600 thus establishing all necessary connections required for performing the non-interactive tests. In turn, the test pad 600 is coupled to the testing system 100. All tests will performed within the confines of a RF shielded enclosure which will partially or fully encapsulate the wireless device under test ("DUT") 700.

In more detail, the test palette 500 is a custom form fitted silicone mold with several cavities 510 and internal components 520 to facilitate a seamless mate to the test pad 600. The test palette 500 provides a simple and universal physical interface between test equipment 100 and the DUT 700. The footprint of the silicone test palette 500 is preferably identical for all wireless products to promote easier set-up of the production line.

In order to reduce the mechanical dynamics required for automated handling of the test palette 500, devices 700 are prepped into palettes 500 before entering an automation stand. An operator is required to insert all cables and a battery emulator into the device 700 prior to use of the palette 500. The ability to prep devices 700 into palettes 500 allows the operator to accumulate handling time into a single bulk session before submitting the palettes 500 to the automation stand for processing.

Each palette 500 includes four internal columns 530, 531, 532, 533 that allows two or more palettes to be stacked on top of each other. Therefore, palettes can either flow via a queue (i.e., in-line conveyer belt flow) or via stacking (i.e., pile-up devices for block processing).

Test palettes 500 can be handled manually by operators or by vacuum power. Each palette includes two internally mounted aluminium rods 531, 532 each having a flat circular surface 540 at one end. The aluminum rods 531, 532 act as support columns for stacking purposes and also provide adequate surface area for lifting of the palette with a vacuum suction device.

The silicone mold for each device includes cavities 510 that enable a wide variety of tests to be performed. All external features of each palette 500 are identical, however the internal cavities 510 can differ to accommodate different wireless device models.

Due to the nature of audio testing, air seals are critical for repeatable and reliable measurements. By molding the silicone to the exact form factor of the wireless device 700, a snug fit (like a wetsuit for scuba diving) is provided to maintain the air seals. T2 Translucent Base Silicone can be used to form the test palette 500. It, and other similar varieties of silicone, are light in weight (~700 g), tear resistant, highly un-deformable, and provide protection for the wireless device 700 in the event that the palette 500 is inadvertently dropped. It is also a cost effective solution (<$30 per palette) that is mass reproducible to suitable accuracy (<0.1%).

As mentioned, the test palette 500 can contain a variety of internal components 520 and cavities 510. The internal components 520 may include one or more of the following: (1) USB/Serial Cable; (2) Electro-Audio Cable (optional); (3) Battery Emulator; (4) PCB connector plate; (5) ⅜" brass bushings; and (6) Custom Aluminum Rods. The internal cavities 510 may include one or more of the following: (1) LCD Screen Cavity; (2) Keypad Backlight Cavity (optional); (3) Infrared Cavity (optional); (4) LED Cavity (optional); (5) USB/Serial Cable Cavity; and (6) Electro-Audio Cable Cavity (optional).

Figure 4:
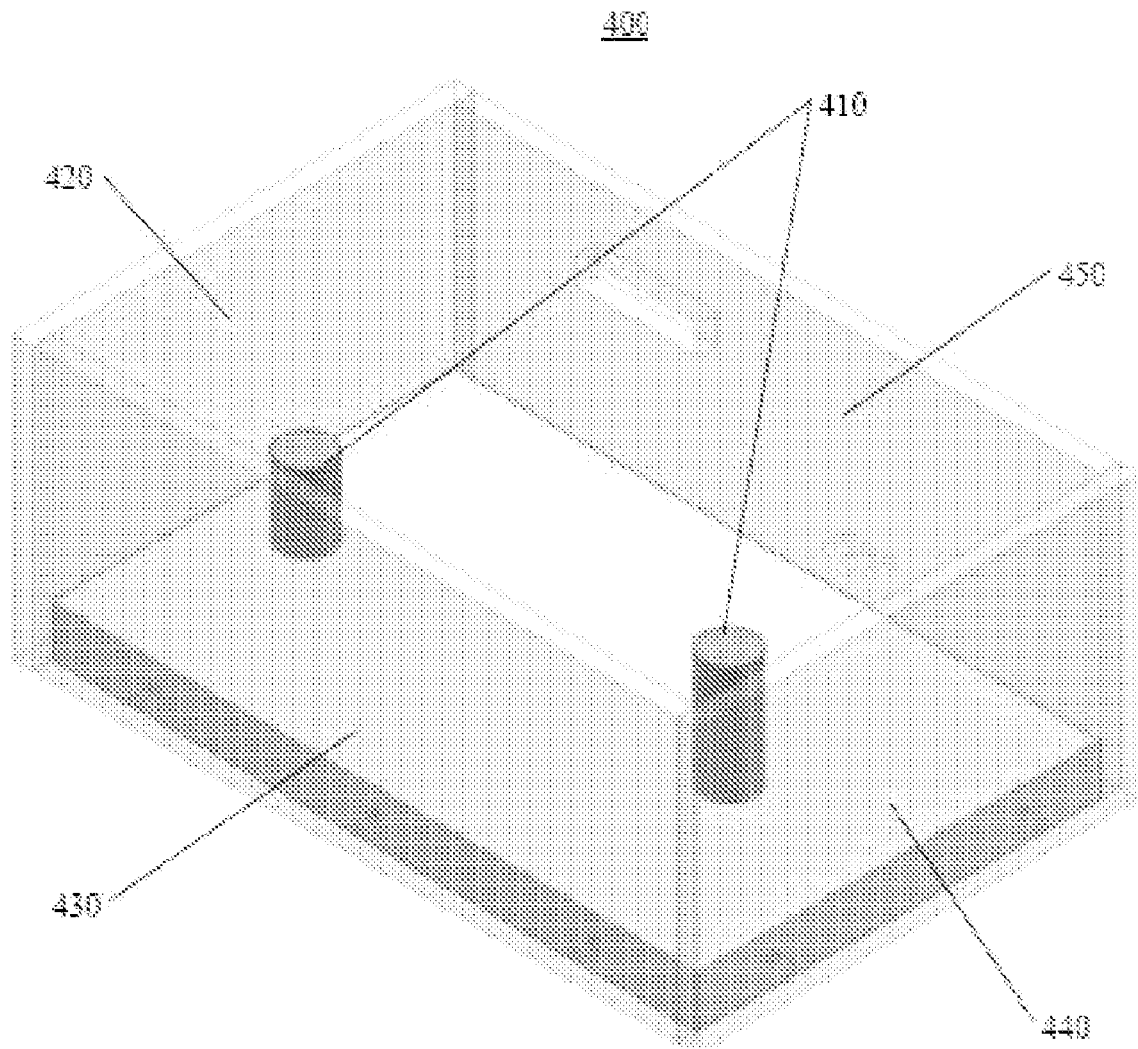
FIG. 4 is a perspective view illustrating a test palette molding enclosure for forming the test palette of FIG. 5 in accordance with an embodiment of the application.

FIG. 4 is a perspective view illustrating a test palette molding enclosure 400 for forming the test palette 500 of FIG. 5 in accordance with an embodiment of the application. The mold enclosure 400 is used to make and replicate silicone test palettes 500. The footprint of the mold 400 is an exact replica of that of a test pad 600, however it has mounting holes for internal cavity fillers ("ICFs") 410. Depending on the type of wireless device 700 to be molded, different combinations of ICFs 410 will be used. The four walls 420, 430, 440, 450 of the enclosure 400 are detachable for easy separation from the silicone. Certain walls that house cable through-holes can further detach into two pieces making it easy to remove any cabling with connector heads. Only one mold 400 is required for all wireless device models. All one has to do to make a mold 400 for a specific wireless device model 500 is to the change the configuration of ICFs 410.

Figure 6:
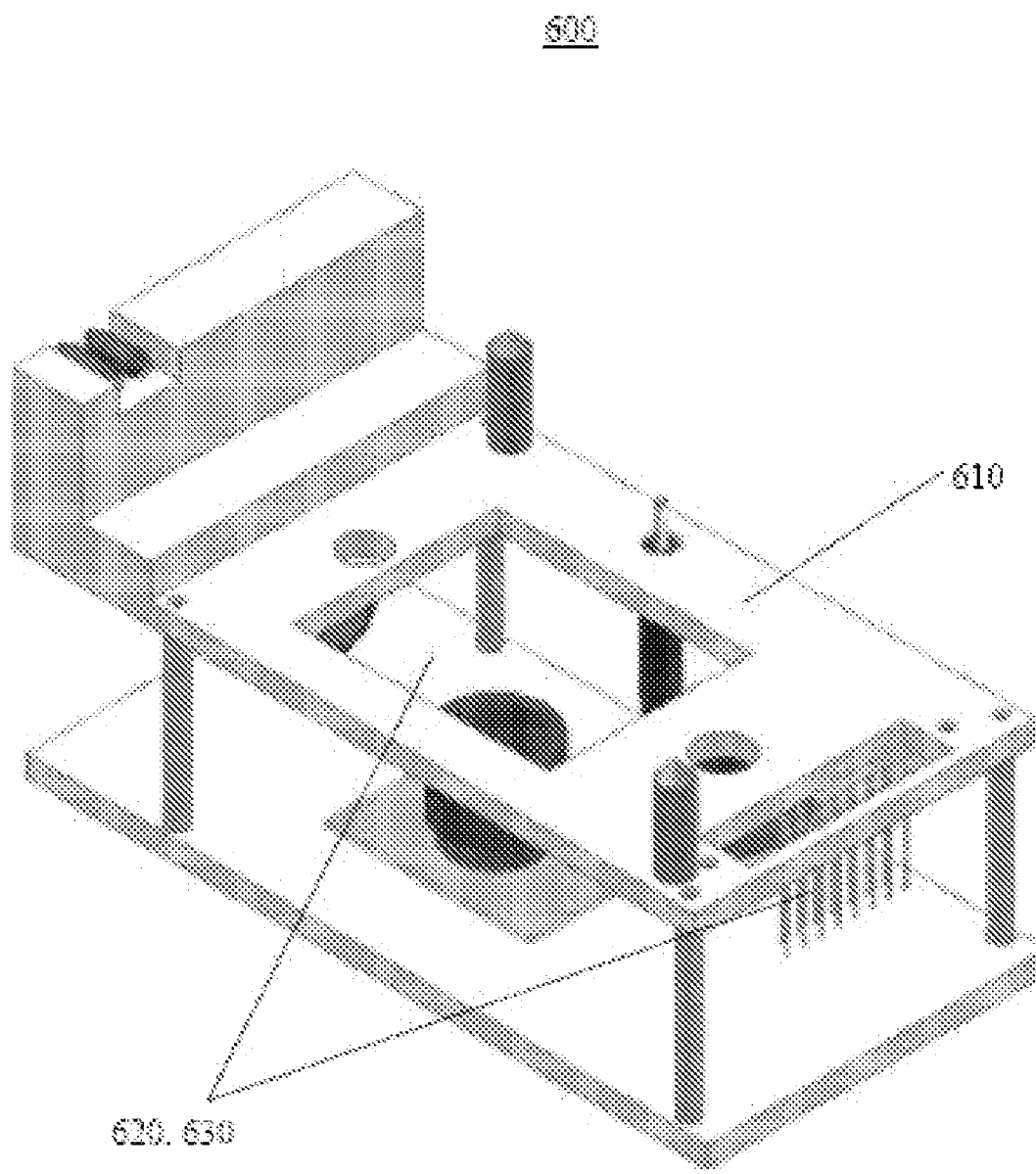
FIG. 6 is a perspective view illustrating a test pad for receiving the test palette of FIG. 5 in accordance with an embodiment of the application.

FIG. 6 is a perspective view illustrating a test pad 600 for receiving the test palette 500 of FIG. 5 in accordance with an embodiment of the application. The test pad 600 works in conjunction with the test palette 500 to provide physical connection between the DUT 700 and the testing system 100 or equipment. The top surface 610 of the test pad 600 matches the footprint of the test palette 500. The test pad 600 is designed to work within a variety of available RF shielded and acoustically shielded boxes (not shown).

The test pad 600 includes a variety of connections 620, 630 to the DUT 700 and test equipment 100. Connections between the test pad 600 and test palette may include one or more of the following: (1) Device Microphone Acoustic path; (2) Device Earpiece Acoustic path; (3) LCD and Keypad Vision path; (4) Infrared Transmitter/Receiver Vision path; (5) Photo-Resistor Vision path; (6) USB/Serial Electrical path (straight through); (7) Battery Emulator Electrical path (straight through); and (8) Audio Jack Electrical path (straight through). Connections 620 between the test pad 600 and test equipment 100 may include one or more of the following: (1) Test Pad Microphone Electrical path; (2) Test Pad Speaker Electrical path; (3) CCD Camera Electrical path; (4) Infrared Transmitter/Receiver Electrical path; (5) Photo-Resistor Electrical path; (6) USB/Serial Electrical path (Straight Through); (7) Unit Detect Sensor Electrical path; (8) Battery Emulator Electrical path (Straight Through); and (9) Audio Jack Electrical path (Straight Through).

The test pad 600 is capable of completing a variety of non-mechanical tests including the following: (1) All RF Related Tests; (2) All Audio Related Tests; and (3) Buzzer, LCD, LED, Backlight, Charger, Infrared, and Holsters Tests.

While the present disclosure is primarily described as a method, a person of ordinary skill in the art will understand that the apparatus discussed above with reference to a testing system may be adapted to enable the practice of the method of the invention.

The embodiments of the present disclosure described above are intended to be examples only. Those of skill in the art may effect alterations, modifications and variations to the particular embodiments without departing from the scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A method for arranging test stages in a production line for the assembling and testing of wireless communications devices, comprising the steps of:
   determining a plurality of tests for testing an assembled wireless communication device, each test in the plurality of tests being one of an interactive test requiring physical actuation or mechanical dynamics to be performed on one or more interactive test components of the assembled wireless communication device, and a non-interactive test requiring no physical actuation or mechanical dynamics to be performed on the assembled wireless communication device;
   allocating each interactive test to an interactive test stage in the production line; and
   allocating each non-interactive test between the interactive test stage and a non-interactive test stage in the production line.

2. The method of claim 1, wherein allocating each non-interactive test comprises allocating all non-interactive tests to the non-interactive test stage in the production line.

3. The method of claim 1, further comprising situating the interactive test stage in the production line together with a stage for final assembly of the device.

4. The method of claim 3, wherein the stage for final assembly comprises activity of a human operator to assemble the device, wherein the interactive test stage comprises activity of a human operator to perform the interactive test stage tests, and wherein the situating facilitates the activities by a single human operator.

5. The method of claim 2, wherein each non-interactive test is allocated to a test fixture for bearing the assembled wireless communication device during the non-interactive test stage, the fixture comprising no mechanical dynamics for actuating the assembled wireless communication device.

6. The method of claim 1, wherein the one or more interactive test components are one or more of a user input device of the wireless communication device and a holstering sensor of the wireless communication device for detecting when the wireless communication device has been holstered.

7. The method of claim 1, wherein the interactive test stage and non-interactive test stage are spatially separated in the production line.

8. A method of testing assembled wireless communications devices in a production line, comprising the steps of:
   receiving an assembled wireless communications device in the production line for testing in accordance with a plurality of tests comprising: one or more interactive tests each requiring physical actuation or mechanical dynamics to be performed on one or more interactive test components of the assembled wireless communication device, and one or more non-interactive tests each requiring no physical actuation or mechanical dynamics to be performed on the assembled wireless communication device;
   performing each of the interactive tests at an interactive test stage in the production line; and
   performing each of the non-interactive tests at a non-interactive test stage in the production line.

9. The method of claim 8, wherein the assembled wireless communication device is received at the interactive test stage situated together with a stage for final assembly of the device; and wherein a single human operator fully assembles and interactively tests the assembled wireless communication device.

10. The method of claim 8, wherein each non-interactive test is performed utilizing a test fixture for bearing the assembled wireless communication device to perform the non-interactive tests at the non-interactive test stage, the fixture comprising no mechanical dynamics for actuating the assembled wireless communication device.

11. The method of claim 8, wherein the one or more interactive test components are one or more of a user input device of the wireless communication device and a holstering sensor of the wireless communication device for detecting when the wireless communication device has been holstered.

12. The method of claim 8, wherein the interactive test stage and non-interactive test stage are spatially separated in the production line.

13. A production line for assembling wireless communication devices, comprising:
   a final assembly stage for finally assembling the wireless communication devices;
   an interactive test stage for performing one or more interactive tests requiring a physical actuation or mechanical dynamics to be performed on one or more interactive test components of the assembled wireless communication devices; and
   a non-interactive test stage for performing one or more non-interactive tests requiring no physical actuation or mechanical dynamics to be performed on the assembled wireless communication devices.

14. The production line of claim 13, further comprising one or more preliminary assembly and testing stages prior to the final assembly stage.

15. The production line of claim 13, wherein all non-interactive tests to be performed are allocated to the non-interactive test stage.

16. The production line of claim 13, wherein the interactive test stage and final assembly stage are situated together in the production line.

17. The production line of claim 16, wherein the final assembly stage comprises activity of a human operator to assemble the wireless communication device, wherein the interactive test stage comprises activity of a human operator to perform the interactive tests, and wherein the situating facilitates the activities by a single human operator.

18. The production line of claim 13, wherein the non-interactive test stage includes at least one test fixture each for bearing individual assembled wireless communication devices during the non-interactive test stage, the at least one test fixture comprising no mechanical dynamics for actuating the assembled wireless communication device.

19. The production line of claim 13, wherein the one or more interactive test components are one or more of a user input device of the wireless communication device and a holstering sensor of the wireless communication device for detecting when the wireless communication device has been holstered.

20. The production line of claim 13, wherein the interactive test stage and non-interactive test stage are spatially separated in the production line.

21. A wireless communication device tested in accordance with the method of claim 8.

* * * * *